(12) United States Patent
Shigematsu et al.

(10) Patent No.: US 10,377,210 B2
(45) Date of Patent: Aug. 13, 2019

(54) DRAIN HOSE

(71) Applicant: JAPAN CLIMATE SYSTEMS CORPORATION, Hiroshima (JP)

(72) Inventors: Ryosuke Shigematsu, Hiroshima (JP); Toshiki Hakata, Hiroshima (JP)

(73) Assignee: JAPAN CLIMATE SYSTEMS CORPORATION, Hiroshima (JP)

( * ) Notice: Subject to any disclaimer, the term of this patent is extended or adjusted under 35 U.S.C. 154(b) by 154 days.

(21) Appl. No.: 15/168,341

(22) Filed: May 31, 2016

(65) Prior Publication Data

US 2016/0272050 A1   Sep. 22, 2016

Related U.S. Application Data (63) Continuation of application No. PCT/JP2014/006515, filed on Dec. 26, 2014.

(30) Foreign Application Priority Data

Dec. 27, 2013 (JP) ................. 2013-272531

(51) Int. Cl.
*B60H 1/32* (2006.01)
*F24F 13/22* (2006.01)
(Continued)

(52) U.S. Cl.
CPC ....... *B60H 1/3233* (2013.01); *B60H 1/00571* (2013.01); *F16L 5/027* (2013.01); *F24F 13/22* (2013.01); *F25D 21/14* (2013.01)

(58) Field of Classification Search
CPC ..... F16L 5/027; F16L 37/0847; F16L 37/098; F16L 37/133; B60H 1/3233; B60H 1/00571; F25D 21/14; F24F 2013/227
(Continued)

(56) References Cited

U.S. PATENT DOCUMENTS 3,083,041 A * 3/1963 Owenmark ............. A47L 9/244
285/302
4,591,192 A * 5/1986 Van Exel ............. F16L 37/144
285/305

(Continued)

FOREIGN PATENT DOCUMENTS

EP    0 936 394 A2    8/1999
JP    5-319079 A    12/1993
(Continued)

OTHER PUBLICATIONS

International Search Report for corresponding International Application No. PCT/JP2014/06515 dated Apr. 7, 2015, 5 pages.
(Continued)

*Primary Examiner* — Anna M Momper
*Assistant Examiner* — Fannie C Kee
(74) *Attorney, Agent, or Firm* — Renner, Otto, Boisselle & Sklar, LLP (57) ABSTRACT

A drain hose (1) includes a drain hose body (10) and a hard member (20). The hard member (20) includes a notch (22) and hooks (21). The drain hose body (10) includes a protruding portion (14) provided to a part, of an outer periphery of the drain hose body (10), to which the hard member (20) is attached. The protruding portion (14) protrudes to be positioned in the notch (22), and, when force is applied to the drain hose body (10) in a direction to pull the drain hose body (10) from a through hole (P1), depresses edge portions (22a) of the notch (22) in a direction to expand the hard member (20) in diameter.

2 Claims, 10 Drawing Sheets

(51) Int. Cl.
*F16L 5/02* (2006.01)
*B60H 1/00* (2006.01)
*F25D 21/14* (2006.01)

(58) Field of Classification Search
USPC ........ 285/364, 111, 192, 194, 208, 189, 319
See application file for complete search history.

(56) References Cited

U.S. PATENT DOCUMENTS

| | | | | |
|---|---|---|---|---|
| 4,721,331 | A * | 1/1988 | Lemelshtrich | F16L 37/084 285/305 |
| 6,173,994 | B1 * | 1/2001 | Ketcham | F16L 19/028 285/233 |
| 6,880,586 | B2 * | 4/2005 | Crowley | B60K 15/04 141/286 |
| 7,156,574 | B1 * | 1/2007 | Garst | B60R 15/00 137/181 |
| 7,159,270 | B2 * | 1/2007 | Genoa | A47L 9/242 15/314 |
| 7,797,788 | B2 * | 9/2010 | Tong | A47L 5/30 15/323 |
| 2008/0224469 | A1 * | 9/2008 | Ostergren | F16L 37/088 285/313 |

FOREIGN PATENT DOCUMENTS

| | | |
|---|---|---|
| JP | 2002-274162 A | 9/2002 |
| JP | 2005-98535 A | 4/2005 |
| JP | 2009-96353 A | 5/2009 |
| JP | 4882884 B | 12/2011 |

OTHER PUBLICATIONS

Form PCT/ISA/237 for corresponding International Application No. PCT/JP2014/006515 dated Apr. 7, 2015, 3 pages.

* cited by examiner

DRAIN HOSE

CROSS-REFERENCE TO RELATED APPLICATION

This is a continuation of International Application No. PCT/JP2014/006515 filed on Dec. 26, 2014, which claims priority to Japanese Patent Application No. 2013-272531 filed on Dec. 27, 2013. The entire disclosures of these applications are incorporated by reference herein.

BACKGROUND

The present disclosure relates to a drain hose to be used for draining condensation of, for example, vehicle air conditioners.

A typical air conditioner, such as a vehicle air conditioner, is provided with a drain hose for draining condensation, collected in a collector, out of a cabin of a vehicle (see, for example, Japanese Patent No. 4882884). A drain hose disclosed in Japanese Patent No. 4882884 includes a soft hose part made of a rubber material which is an elastic material, and a hard part made of a resin material such as a polypropylene material. The soft hose part has an upstream end portion coupled to a drain outlet opening on a bottom wall of the collector. The hard part is provided with a pipe portion, and the soft hose part has a downstream end portion coupled to an upstream end of the pipe portion of the hard part. The hard part is secured to a body panel of the vehicle from the cabin. Here, the pipe portion has a downstream end extending out of the cabin from a through hole opening on the body panel.

Furthermore, a waterstop packing is provided between the downstream end portion of the pipe portion in the hard part and a rim of the through hole on the body panel.

SUMMARY

In Japanese Patent No. 4882884, the hard part positions the downstream end portion of the soft hose part with respect to the body panel. This hard part does not elastically deform, and the waterstop packing has to be provided between the body panel and the rim of the through hole. This construction requires at least three members; namely, the soft hose part, the hard part, and the waterstop packing, which poses a problem of excessive number of parts.

Moreover, the drain hose has to be resistant to fall-off from the body panel, even if pulled after fastened to the body. Moreover, when a worker secures the drain hose to the body, he or she desires to clearly sense the completion of the securement.

The present disclosure is conceived in view of the above problems. When a drain hose is secured to a body panel, the present disclosure intends to allow a worker to easily sense the completion of the securement, and make the secured drain hose difficult to fall off from the body panel. Furthermore, the present disclosure intends to reduce the number of parts.

In order to implement a drain hose according to the present disclosure, the drain hose includes a drain hose body made of an elastic material, and a hard member provided with a hook and attached to the drain hose body. The hook engages with a rim of a through hole on a body panel.

A first aspect of the present disclosure is directed to a drain hose for draining condensation, collected in a collector, out of a cabin of a vehicle. The collector is included in a vehicle air conditioner installed in the cabin. The drain hose includes: a drain hose body made of an elastic member, and including an upstream portion and a downstream portion, the upstream portion being coupled to a drain outlet of the collector, and the downstream portion being provided to extend toward an outside of the cabin from a through hole opening on a body panel, and making contact with a rim of the through hole; and a hard member formed to surround an outer periphery of the downstream portion of the drain hose body, attached to the downstream portion, and made of a material harder than the drain hose body, wherein the hard member includes: a notch defined on a portion of the hard member along a circumference of the hard member; and a hook configured to engage from the outside of the cabin with the rim of the through hole on the body panel, and the drain hose body includes a depressing portion provided to a part, of the drain hose body, to which the hard member is attached, the depressing portion extending to be positioned in the notch, and, when force is applied to the drain hose body in a direction to pull the drain hose body from the through hole, depressing an edge portion of the notch in a direction to expand the hard member in diameter.

In accordance with these features, the hard member is attached to the downstream portion of the drain hose body while the notch of the hard member is opened and the drain hose body is inserted in the hard member. Then, when the downstream portion of the drain hose body is inserted into the through hole of the body panel, the hook of the hard member engages from the outside of the cabin with the rim of the through hole. Here, the hook is a part of the hard member, and clicks and vibrates when engaging with the rim of the through hole on the body panel. Such a click and vibration allow a worker to sense whether the hook has engaged with the rim of the through hole.

When the hook engages with the rim of the through hole, and then, force is applied to, for example, the drain hose body in the direction to pull the drain hose body from the through hole, the depressing portion positioned in the notch of the hard member depresses the edge portion of the notch in the direction to expand the hard member in diameter. Such features allow the hook to be pressed against the rim of the through hole, and the resulting engagement of the hook becomes even firmer.

Moreover, the drain hose body is made of an elastic member. Thus, the drain hose body elastically deforms to conform to the shape of the rim of the through hole, while the downstream portion of the drain hose body makes contact with the rim of the through hole on the body panel. Such deformation may reliably provide a seal to the rim of the through hole without a waterstop packing as disclosed in Japanese Patent No. 4882884.

In a second aspect of the present disclosure according to the first aspect, the notch of the hard member has a width narrower toward an inside of the cabin with respect to the hard member.

In accordance with this feature, the width of the notch of the hard member is narrower toward the inside of the cabin. Thus, when the force is applied to the drain hose body, in a direction to pull the drain hose body toward the inside of the cabin, the depressing portion positioned in the notch depresses the edge portion of the notch to expand the width of the notch. Such a feature may reliably expand the hard member in diameter.

In a third aspect of the present disclosure according to the first aspect, the depressing portion of the drain hose body has a width wider toward the outside of the cabin with respect to the depressing portion.

In accordance with this feature, the width of the depressing portion of the drain hose body is wider toward the outside of the cabin. Thus, when the force is applied to the drain hose body, in the direction to pull the drain hose body toward the inside of the cabin, the depressing portion positioned in the notch acts as a wedge to expand the width of the notch. Such a feature may reliably expand the hard member in diameter.

In a fourth aspect of the present disclosure according to any one of the first aspect to the third aspect, the drain hose body includes, on the downstream portion, a seal provided along a whole circumference of the drain hose body, externally extending in a radial direction of the drain hose body, and making contact with the rim of the through hole on the body panel.

When the downstream portion of the drain hose body is inserted into the through hole on the body panel, such a feature allows the seal to make contact with the whole circumference of the rim of the through hole, which may provide an enhanced seal to the drain hose.

According to the first aspect, the hard member having the hook is provided to the downstream portion of the drain hose body. When the drain hose is secured to the body panel, such a feature allows the worker to easily sense the completion of the securement. Moreover, when the force is applied to the drain hose body in the direction to pull the drain hose body from the through hole, the edge portion of the notch of the hard member is depressed in the direction to expand the hard member in diameter. Such a feature makes the secured drain hose to be resistant to fall-off from the body panel. Furthermore, the first aspect reliably provides a seal to the rim of the through hole without a waterstop packing. Such a feature may reduce the number of parts.

According to the second aspect, the width of the notch of the hard member is narrower toward the inside of the cabin. Thus, when the force is applied to the drain hose body, in a direction to pull the drain hose body, from the through hole of the body panel toward the inside of the cabin, the hard member may reliably expand in diameter. Such a feature allows the hook to engage with the rim of the through hole even firmly.

According to the third aspect, the width of the depressing portion of the drain hose body is wider toward the outside of the cabin. Thus, when the force is applied to the drain hose body, in a direction to pull the drain hose body, from the through hole of the body panel toward the inside of the cabin, the hard member may reliably expand in diameter. Such a feature allows the hook to engage with the rim of the through hole even firmly.

According to the fourth aspect, the drain hose body includes, on the downstream portion, the seal provided along the whole circumference of the drain hose body, and making contact with the rim of the through hole on the body panel. Such a feature may provide an enhanced seal to the drain hose.

BRIEF DESCRIPTION OF THE DRAWINGS

FIGS. 12A and 12B are cross-sectional views of the drain hose taken from line VI-VI of FIG. 1. FIG. 12A illustrates the drain hose before being secured to the body. FIG. 12B illustrates the drain hose after being secured to the body.

DETAILED DESCRIPTION

Embodiments of the present disclosure, with reference to the drawings. Note that the embodiments to be described below are merely examples in nature and are not intended to limit the scope, application or use of the present disclosure.

Figure 1:
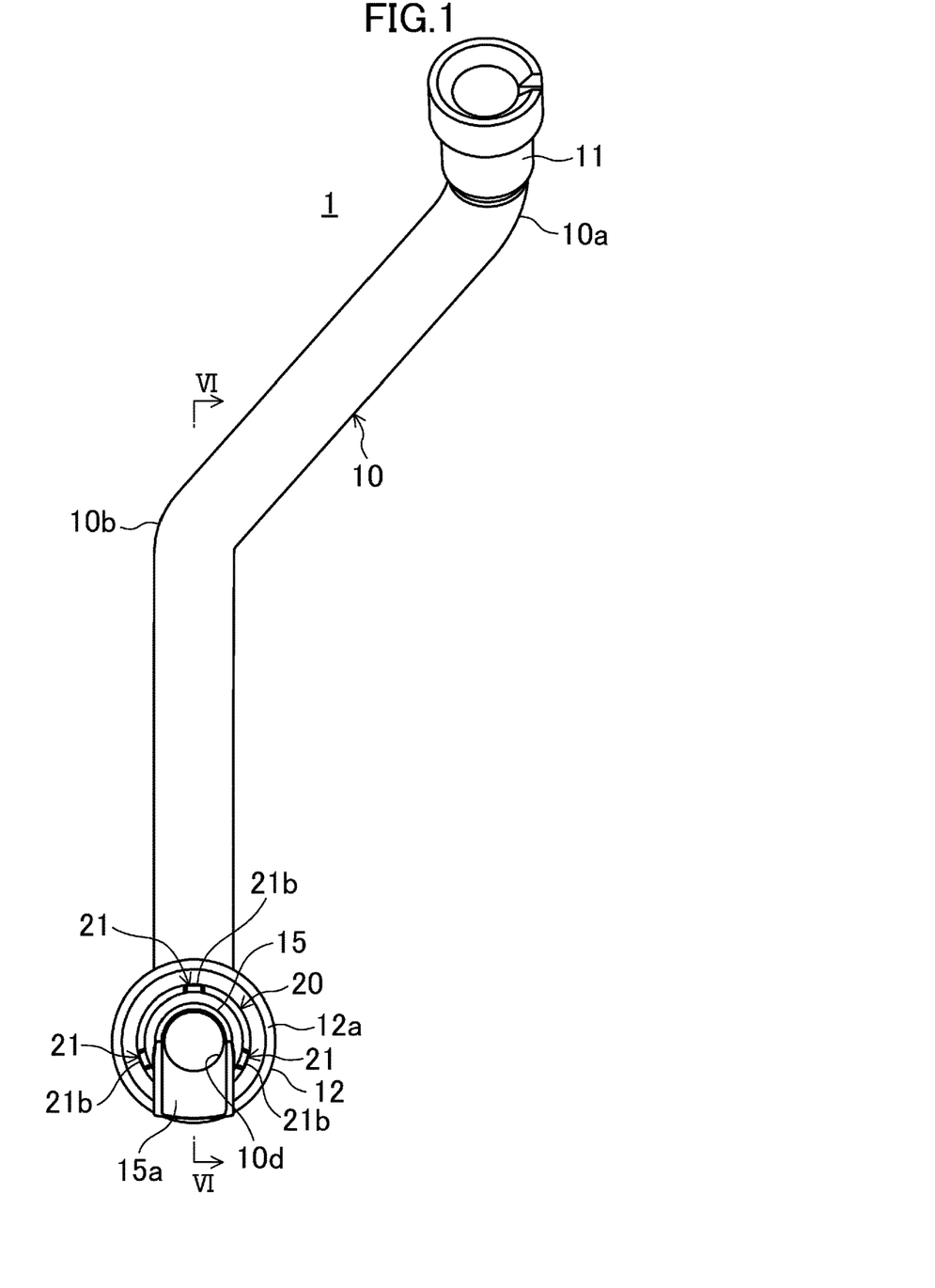
FIG. 1 is a right side view of a drain hose according to embodiments of the present disclosure.
Figure 2:
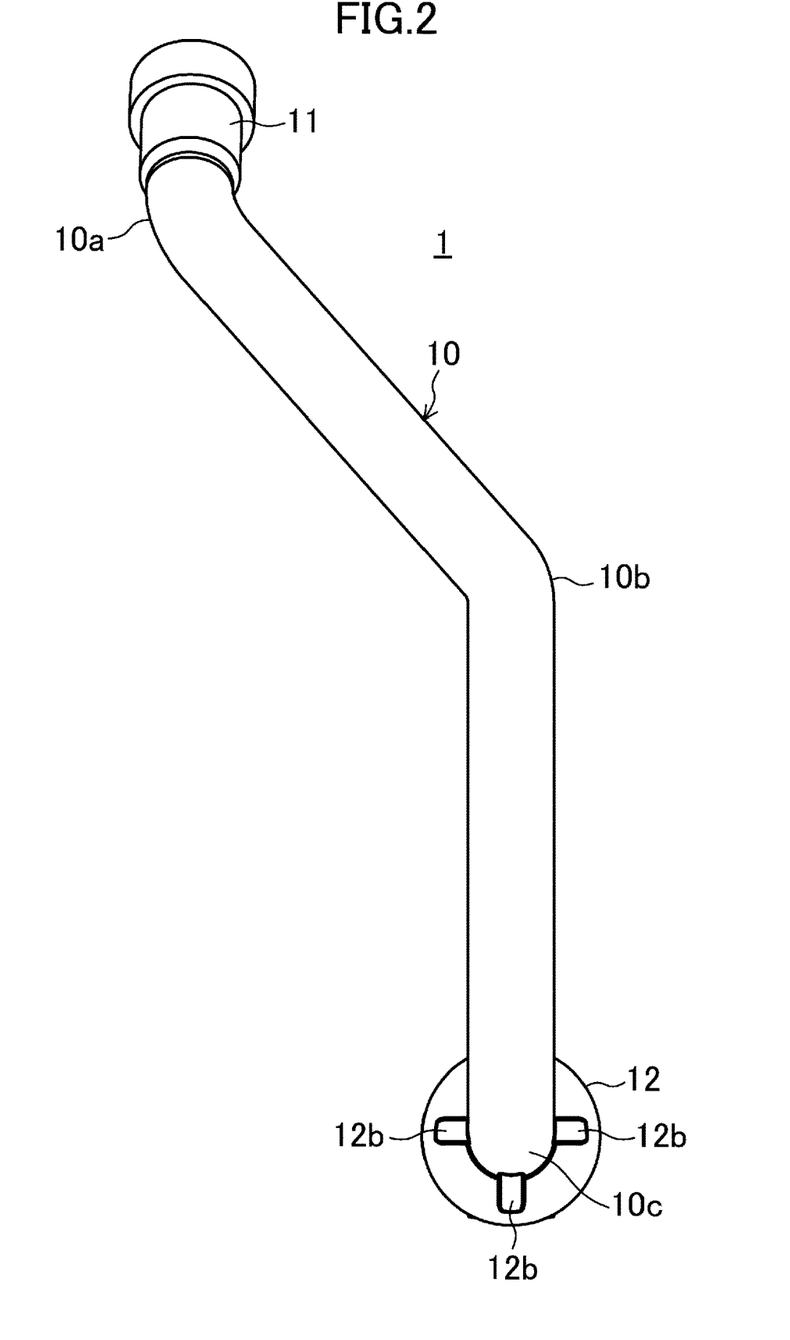
FIG. 2 is a left side view of the drain hose.

FIG. 1 and FIG. 2 are respectively a right side view and a left side view of a drain hose 1 according to embodiments of the present disclosure. The drain hose 1 is used to drain condensation, collected in a collector 100 (see the illustration drawn in imaginary lines in FIG. 3), out of a cabin of a vehicle. The collector 100 is included in, for example, a vehicle air conditioner installed in a cabin of the vehicle. The collector 100 contains a not-shown cooling heat-exchanger for cooling air for the air conditioner. The collector 100 has a bottom wall 101 provided with a drain pipe 102 protruding downward from the lowest portion of the bottom wall 101. Thus, the condensation condensed on a surface of the cooling heat-exchanger runs down to the bottom wall 101 of the collector 100, and flows toward the drain pipe 102. Then, the condensation flows out of the collector 100 from a not-shown drain outlet opening on a not-shown downstream end portion of the drain pipe 102.

Note that, in these embodiments, the front, rear, left, and right of the vehicle are simply referred to as the "front", "rear", "left", which is also indicated by arrow L in the figures, and "right", which is also indicated by arrow R in the figures, respectively.

The drain hose 1 includes a drain hose body 10 including an elastic member such as rubber, and a hard member 20 including a hard material such as nylon. The material of the hard member 20 may be any given material harder than the drain hose body 10, and does not have to be limited to nylon. As will be described later, such a material may beneficially be elastic to some degree and expand in diameter on an elastic deformation area.

The drain hose body 10 extends in an approximate vertical direction. The upper portion and lower portion of the drain hose body 10 are respectively an upstream portion and a downstream portion thereof. The drain hose body 10 has the upstream portion provided with an upstream coupling portion 11 to be coupled to a drain outlet of a drain pipe 102 on the collector 100. The upstream coupling portion 11 is formed larger in diameter than a middle portion of the drain hose body 10, and diagonally extends upward. While a tip portion of the drain pipe 102 is inserted into the upstream coupling portion 11, an outer periphery of the drain pipe 102 and an inner periphery of the upstream coupling portion 11 make close contact with each other to be kept sealed.

Figure 3:
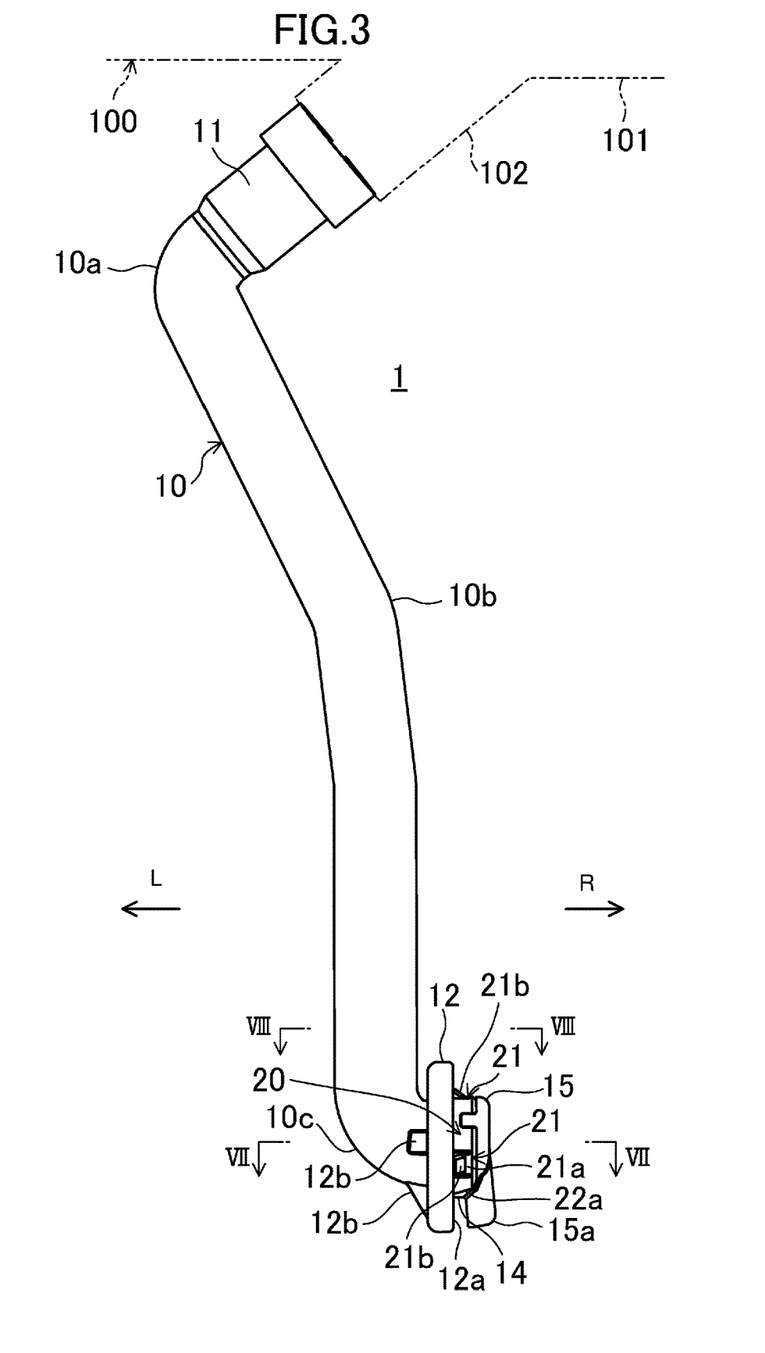
FIG. 3 is a back side view of the drain hose.
Figure 4:
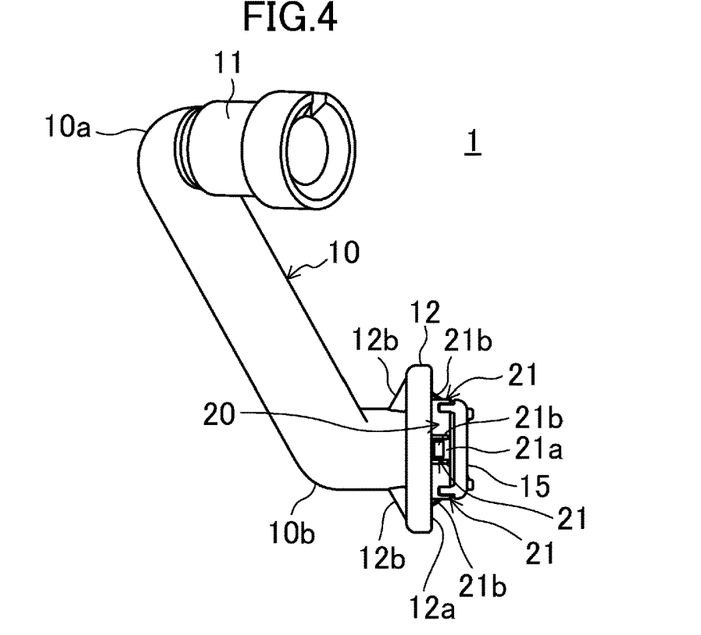
FIG. 4 is a plan view of the drain hose.

The drain hose body 10 includes, downstream of the upstream coupling portion 11, a first bent portion 10a bent at an approximately right angle when seen from the back (see FIG. 3). The drain hose body 10 linearly extends diagonally downward downstream of the first bent portion 10a, as illustrated in FIG. 1. The drain hose body 10 includes, near its vertical middle portion, a second bent portion 10b. Moreover, the drain hose body 10 includes a portion, downstream of the second bent portion 10b, extending in an generally vertical manner as illustrated in FIGS. 1 to 3. The drain hose body 10 includes downstream a third bent portion 10c, and the downstream portion of the drain hose body 10 extends toward the right.

Figure 12A:
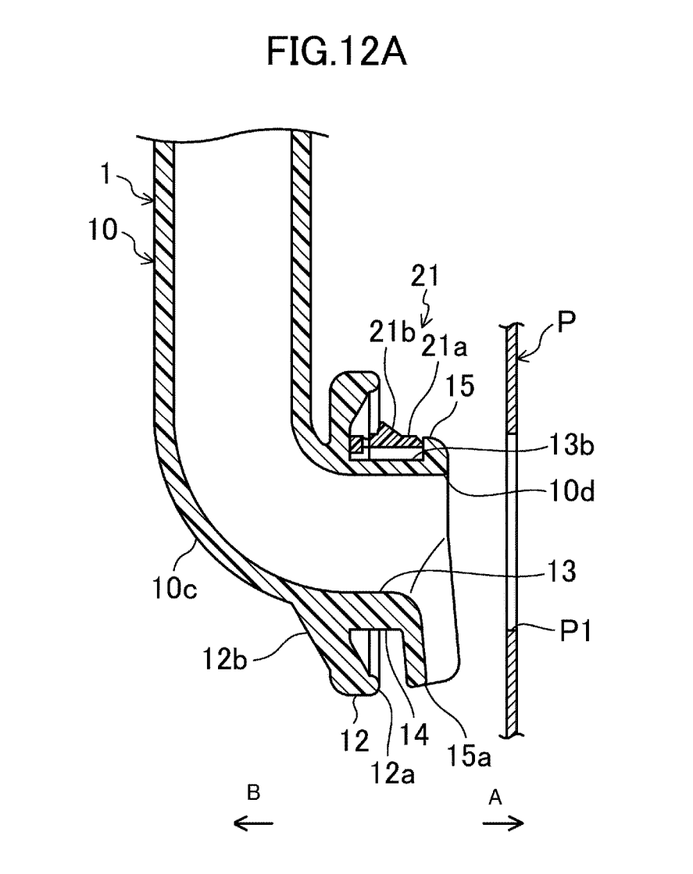
Figure 12B:
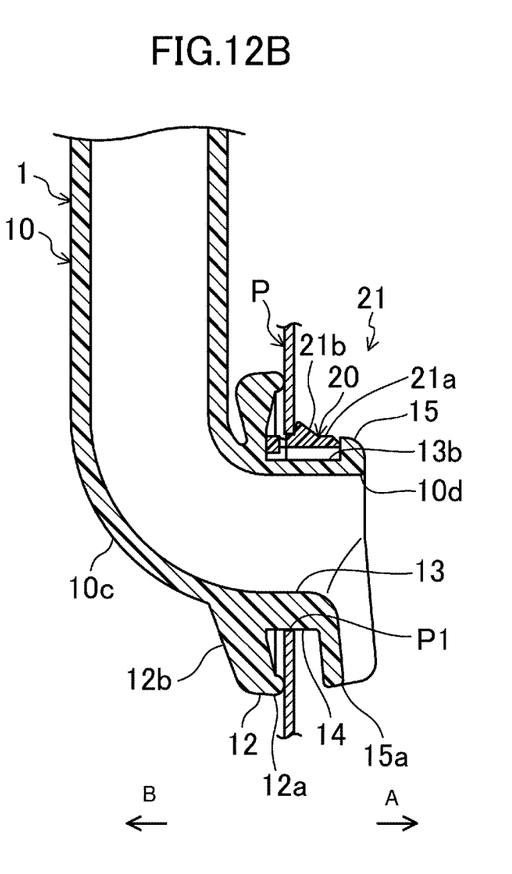

The downstream portion of the drain hose body 10 is provided to extend toward an outside of the cabin, as indicated by arrow A in the figures, from a through hole P1 opening on a body panel P illustrated in FIG. 12B. In these embodiments, the body panel P is a part of a side wall of a floor tunnel of the vehicle, and thus vertically extends. The body panel P has a through hole P1 formed in an approximate circle. Note that the body panel P does not have to extend in the vertical direction alone. For example, the body panel P may extend in an generally horizontal direction as, for example, a floor panel does. Here, the downstream portion of the drain hose body 10 may be formed to extend perpendicularly to the body panel P.

The drain hose body 10 includes a seal 12 provided with the downstream portion. As illustrated in FIG. 12B, this seal 12 makes contact with a rim of the through hole P1 of the body panel P to provide a seal between the rim of the through hole P1 and the downstream portion of the drain hose body 10. The seal 12 externally extends from the outer periphery of the downstream portion in a radial direction of the drain hose body 10. The seal 12 is formed flanged along a whole circumference of the drain hose body 10. This seal 12 is flanged and elastically deforms easily along a thickness of the seal 12. When making contact with the rim of the through hole P1, the seal 12 conforms to the shape of the rim.

The seal 12 has an extending end portion provided with a projection portion 12a protruding toward the body panel P and extending in the form of a closed ring. This projection portion 12a makes contact with the body panel P. Moreover, the seal 12 has a face away from the body panel P provided with ribs 12b. The ribs 12 continue to the outer periphery of the drain hose body 10 and are arranged at intervals along the circumference of the seal 12.

Figure 10:
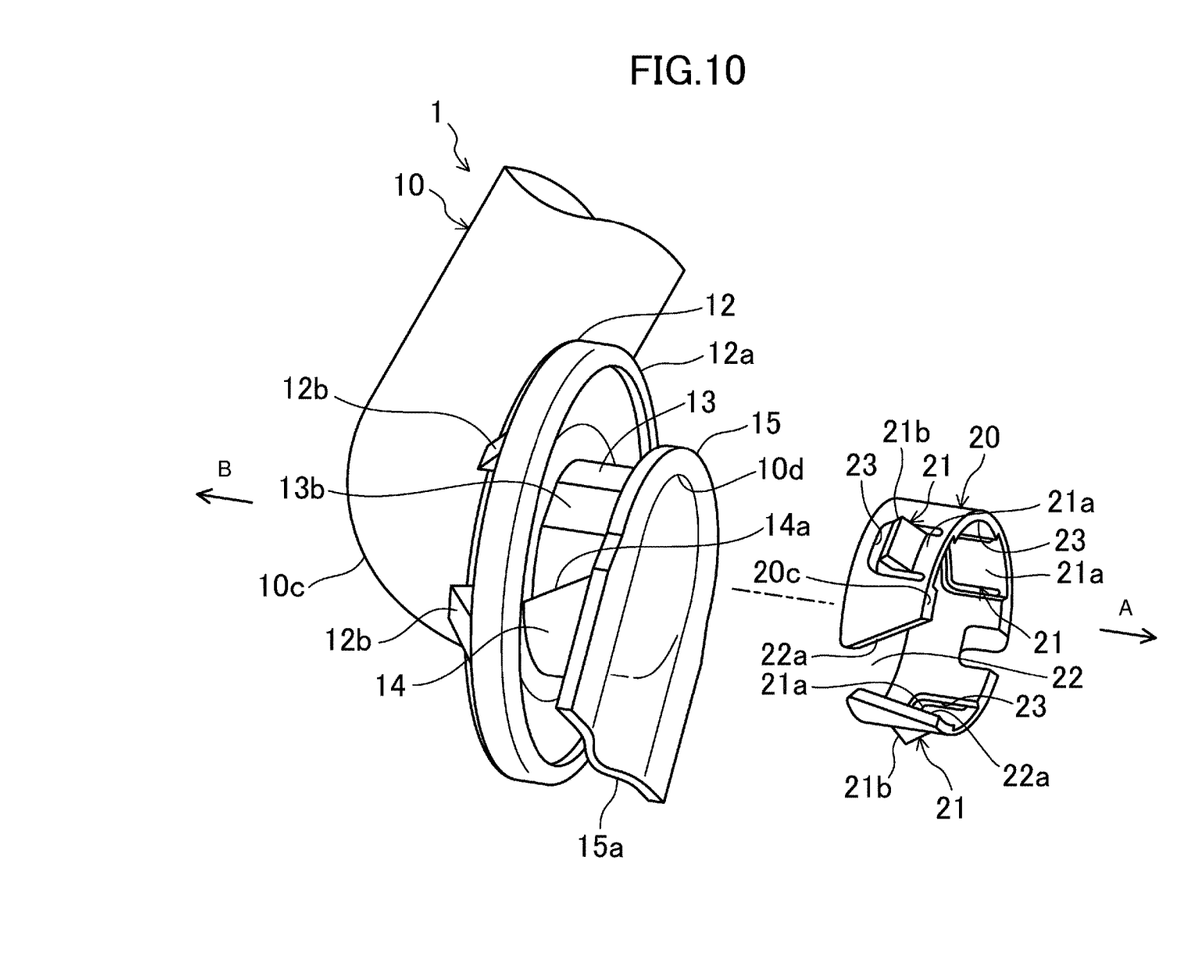
FIG. 10 is an exploded perspective view of the lower portion of the drain hose.

A hard member attaching portion 13, to which the hard member 20 is attached, is provided downstream of the seal 12 of the drain hose body 10. The hard member attaching portion 13 is shaped in an approximate ring of which an axis extends horizontally. As illustrated in FIG. 10, for example, a protruding portion (depressing portion) 14, protruding downward, is provided to a lower portion of the outer periphery of the hard member attaching portion 13. This protruding portion 14 protrudes to be positioned in a notch 22 of the hard member 20. The notch 22 will be described later.

Figure 7:
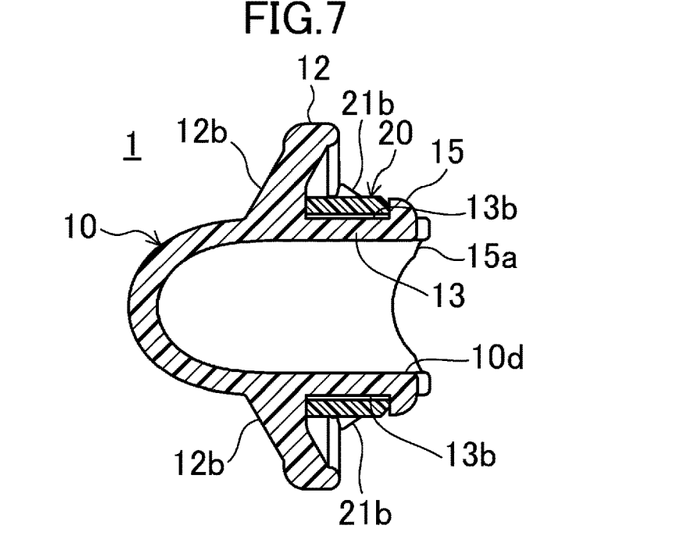
FIG. 7 is a cross-sectional view taken from line VII-VII of FIG. 3.
Figure 8:
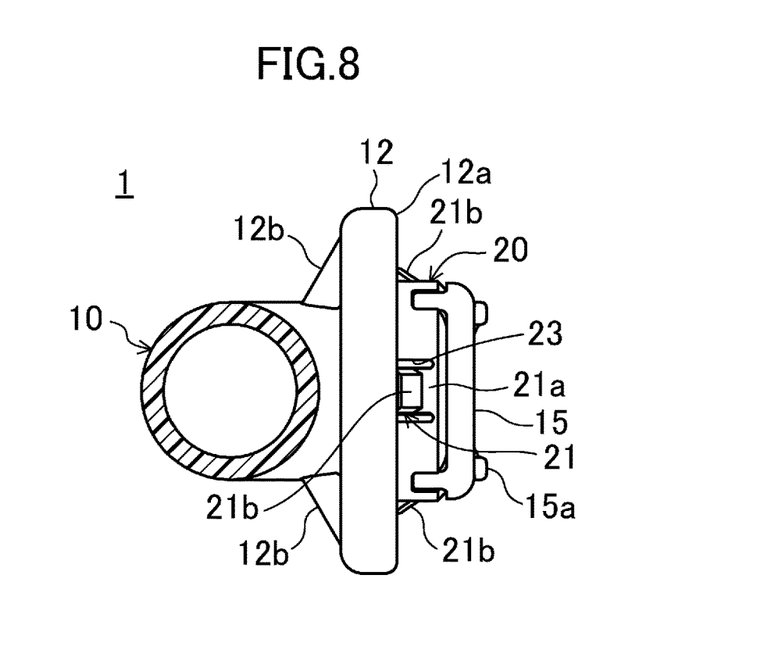
FIG. 8 is a cross-sectional view taken from line VIII-VIII of FIG. 3.

Furthermore, the outer periphery of the hard member attaching portion 13 is provided with three flat faces 13b (see FIGS. 7 and 10) formed at intervals along the circumference of the outer periphery. The flat faces 13b are each arranged to one of the upper portion, front, and rear of the outer periphery of the hard member attaching portion 13.

Figure 5:
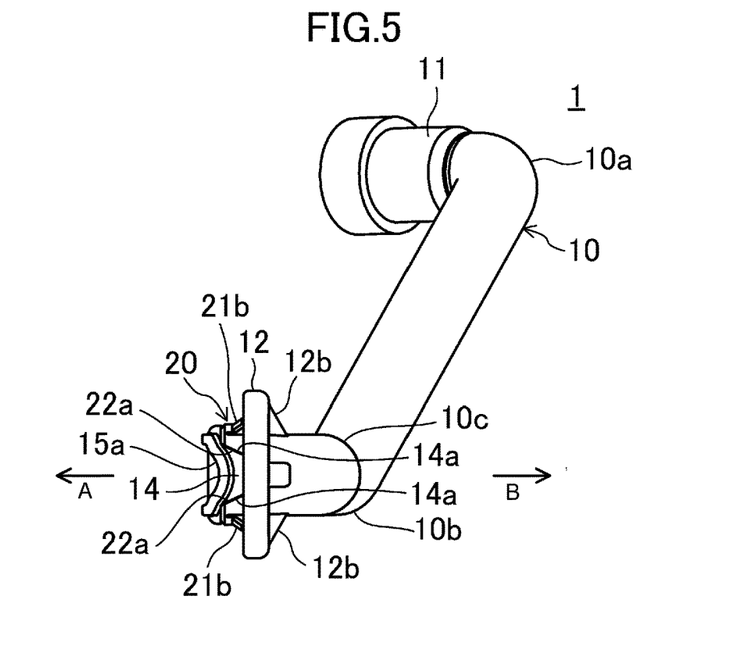
FIG. 5 is a bottom view of the drain hose.

The protruding portion 14 has side faces 14a (see FIGS. 5, 9, 10) provided along the periphery of the drain hose body 10, and extending in a generally vertical direction. Moreover, when seen from below as illustrated in FIG. 5, the side faces 14a of the protruding portion 14 slope with respect to the axis of the hard member attaching portion 13. The side faces 14a slope away from each other as protruding toward the outside of the protruding portion 14. Hence, the protruding portion 14 has a width wider toward the outside of the cabin.

Figure 6:
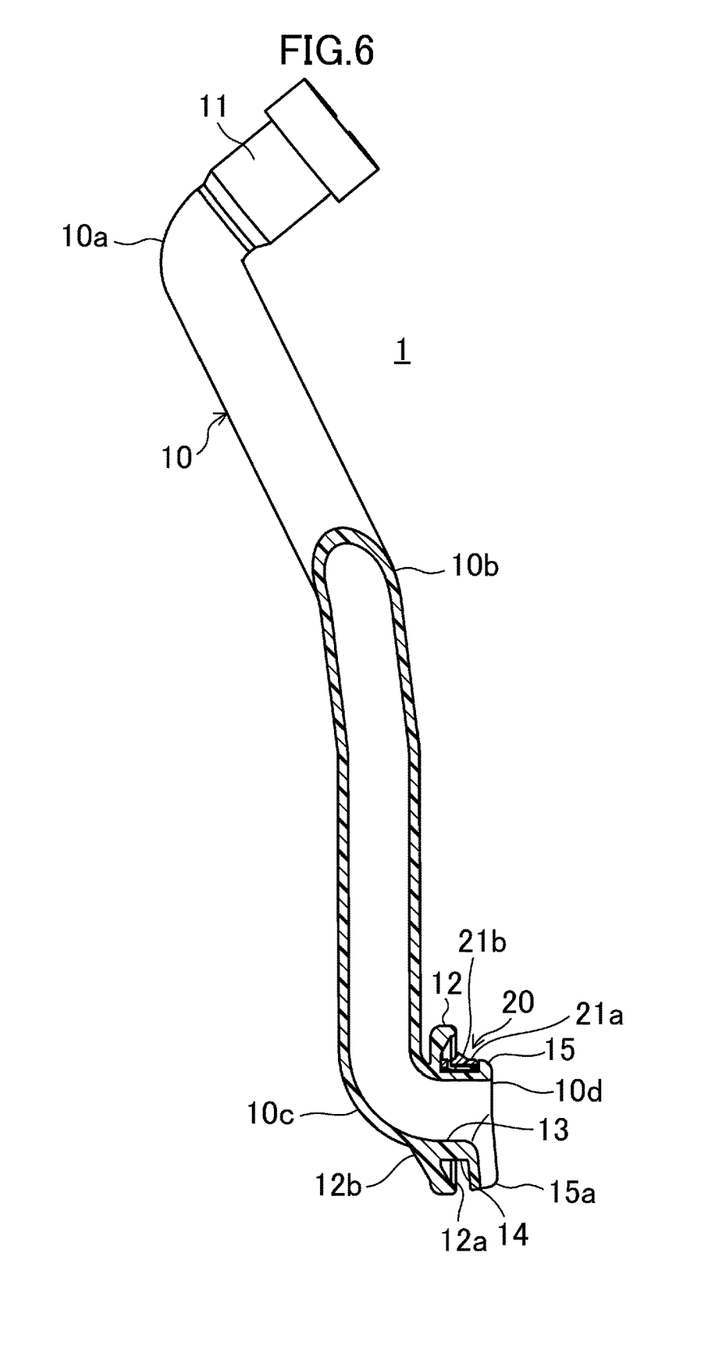
FIG. 6 is a cross-sectional view taken from line VI-VI of FIG. 1.
Figure 9:
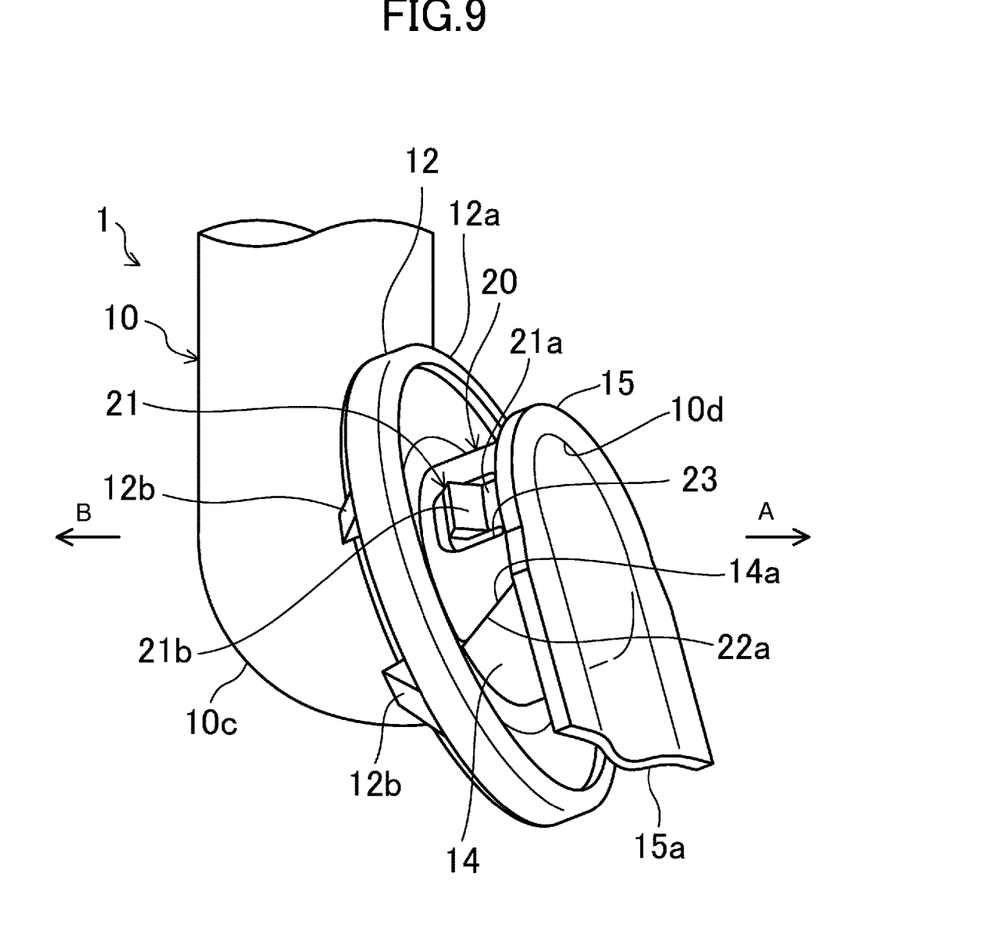
FIG. 9 is a perspective view of a lower portion of the drain hose.

In addition, as illustrated in FIG. 6, for example, the drain hose body 10 is provided with a downstream end opening 10d opening on an end face downstream of the hard member attaching portion 13. As illustrated in FIG. 9, for example, the rim of the downstream end opening 10d on the drain hose body 10 is provided with an extending portion 15 extending in a radial direction of the rim. The extending portion 15 has a rim located outside the outer periphery of the hard member attaching portion 13. The extending portion 15 has a lower portion 15a which extends further than an upper portion and a side portion of the extending portion 15 do. As illustrated in FIG. 6, an end portion of the lower portion 15a of the extending portion 15 and an end portion of the seal 12 are positioned approximately the same in level. The lower portion 15a of the extending portion 15 has a middle portion, along the width (in the front-rear direction). The middle portion is curved toward, and located closest to, an outer face of the body panel P.

Figure 11:
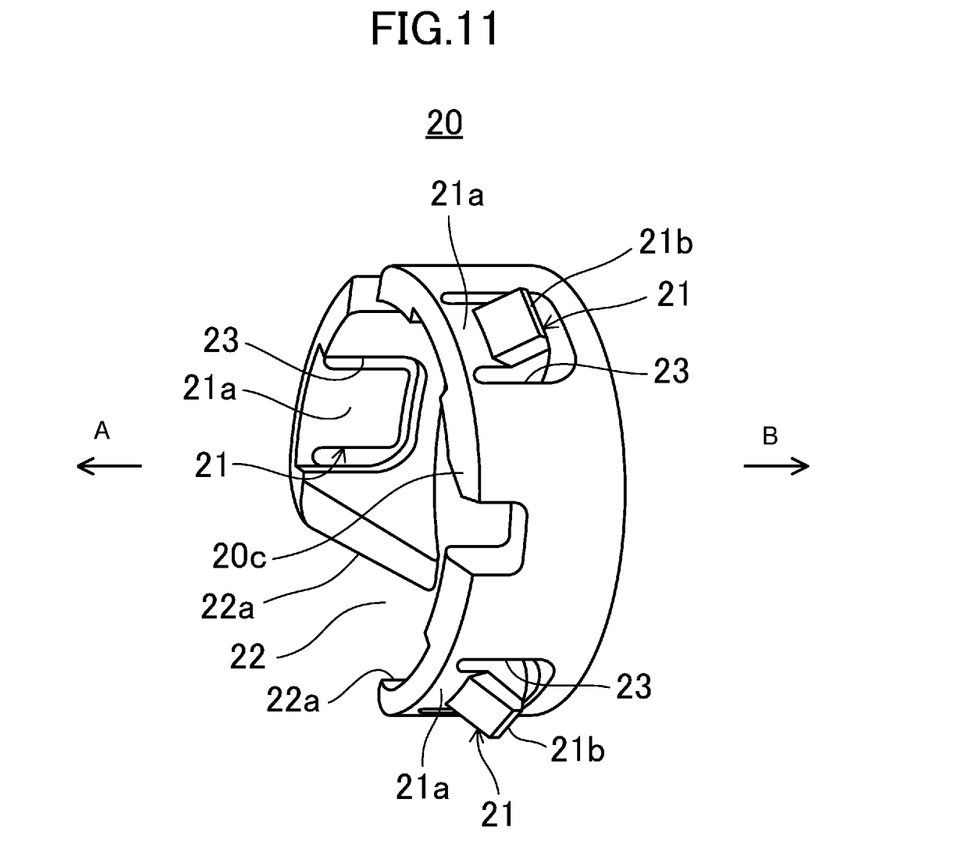
FIG. 11 is a perspective view of a hard member.

As illustrated in FIGS. 9 to 11, the hard member 20 is formed to surround the hard member attaching portion 13 (downstream) of the drain hose body 10. The hard member 20 has the notch 22 defined on a portion of the hard member 20 along the circumference. The defined notch 22 makes the portion of the hard member 20 open, and allows the hard member 20 to expand and shrink in diameter by external force. In these embodiments, the hard member 20 is generally C-shaped, and attached to the hard member attaching portion 13 so that the notch 22 is positioned downward. Moreover, the notch 22 has a width sufficiently narrower than an outer diameter of the hard member attaching portion 13 of the drain hose body 10.

The notch 22 has circumferential edge portions 22a (see FIGS. 5 and 11). When seen from below, the circumferential edge portions 22a slope closer to each other, as extending toward the inside of the cabin, as indicated by arrow B in the figures, with respect to the hard part member 20. Accordingly, the width of the notch 22 is narrower toward the inside of the cabin with respect to the hard member 20.

In addition, the rim of the hard member 20 is provided with a chamfered portion 20c as illustrated in FIGS. 10 and 11. When the hard member 20 is inserted into the through hole P1 of the body panel P, this chamfered portion 20c keeps an edge portion of the hard member 20 from being caught on the rim of the through hole P1.

As illustrated in FIGS. 10 and 12, the hard member 20 is provided with three hooks 21 which engage from the outside of the cabin with the rim of the through hole P1 on the body panel P. The hooks 21 are formed at intervals along the circumference of the hard member 20 to match the flat faces 13b formed on the outer periphery of the hard member attaching portion 13. Specifically, the hooks 21 are each arranged to one of the upper portion, front, and rear of the hard member 20.

The hooks 21 are the same in configuration, and each of the hooks 21 has a flexible piece 21a, and a bump 21b protruding from the flexible piece 21a. Specifically, the hard member 20 has a slit 23 extending into a U-shape so that the flexible piece 21a may be flexed in an internal and external direction of the hard member 20 with respect to the body part of the hard member 20. The flexible piece 21a is integrally formed with an external edge, of the hard member 20, to the outside of the cabin. Hence, the flexible piece 21a flexes so that a portion, of the flexible piece 21a, near the inside of the cabin displaces in the internal and external direction of the hard member 20.

The bump 21*b* is provided to externally protrude from the portion, of the flexible piece 21*a*, near the inside of the cabin in the radial direction of the hard member 20. A protrusion height of the bump 21*b* from the flexible piece 21*a* is set so that a tip of the bump 21*b* is located further radially outside than the outer periphery of the body part of the hard member 20 is. The bump 21*b* engages with the rim of the through hole P1 on the body panel P.

Described below is how to attach the hard member 20 structured above to the drain hose body 10. First, the hard member 20 is expanded in diameter so that the width of the notch 22 of the hard member 20 is open greater. Meanwhile, the hard member attaching portion 13 of the drain hose body 10 is elastically deformed to enter the notch 22 of the hard member 20. After the hard member attaching portion 13 is completely inserted from the notch 22 into the hard member 20, the external force applied to the drain hose body 10 and the hard member 20 is released. Then, as illustrated in FIG. 9, the shapes of the drain hose body 10 and the hard member 20 are restored, and the hard member 20 is attached to, and surrounds, the hard member attaching portion 13 of the drain hose body 10. Here, the protruding portion 14 of the drain hose body 10 is positioned in the notch 22. Specifically, the protruding portion 14 is provided to the portion, on the outer periphery of the drain hose body 10, where the hard member 20 is attached. Thus, the protruding portion 14 protrudes to be positioned in the notch 22. Such features keep the hard member 20 from rotating.

Described next is how to secure the drain hose 1 to the body. First, the upstream coupling portion 11 of the drain hose body 10 with the hard member 20 attached is coupled to the drain pipe 102 of the collector 100.

Then, the downstream portion of the drain hose body 10 is fixed to the body panel P. Specifically, first, as illustrated in FIG. 12A, the downstream portion of the drain hose body 10 is placed to face the through hole P1, on the body panel P, from the inside of the cabin. Then, the lower portion 15*a* of the extending portion 15 on the drain hose body is inserted into the through hole P1 before the upper portion of the extending portion 15. After the lower portion 15*a* of the extending portion 15 is inserted into the through hole P1, the downstream portion of the drain hose body 10 is pressed against the rim of the through hole P1 from the inside of the cabin. Then, the extending portion 15 is squeezed into the through hole P1, and, concurrently, the hooks 21 of the hard member 20 make contact with the rim of the through hole P1, flex to be displaced internally in the radial direction of the hard member 20, and cross over the through hole P1. When the hooks 21 of the hard member 20 cross over the through hole P1 and arrive at the outside of the cabin, the shapes of the hooks 21 are restored and the hooks 21 engage from the outside of the cabin with the rim of the through hole P1. As a result, the downstream portion of the drain hose body 10 is fixed to the body panel P as illustrated in FIG. 12B. When engaging with the rim of the through hole P1, the hooks 21 click and vibrate because they are parts of the hard member 20. Such a click and vibration allow the worker to sense whether the hooks 21 have engaged with the rim of the through hole P1 on the body panel P.

Here, the seal 12 of the drain hose body 10 makes contact with the rim of the through hole P1 on the body panel P, and deforms to conform to the shape of the rim of the through hole P1. Such deformation provides an enhanced seal between the drain hose body 10 and the rim of the through hole P1 without a waterstop packing as disclosed in Japanese Patent No. 4882884.

After the hooks 21 engage with the rim of the through hole P1, for example, the drain hose body 10 could be pulled from the inside of the cabin, and force could be applied to the drain hose body 10 in a direction to pull the drain hose body 10 from the through hole P1. Here, the protruding portion 14 of the drain hose body 10 is positioned in the notch 22 of the hard member 20, and a width of the protruding portion 14 is wider toward the outside of the cabin. Thus, when the drain hose body 10 is pulled toward the inside of the cabin, the protruding portion 14 positioned in the notch 22 acts as a wedge. As a result, the side faces 14*a* of the protruding portion 14 depress the edge portions 22*a* of, and expand the width of, the notch 22. Such features allow the hard member 20 to reliably expand in diameter, and the hooks 21 are pressed against the rim of the through hole P1. The resulting engagement of the hooks 21 becomes even firmer.

Moreover, the width of the notch 22 of the hard member 20 is narrower toward the inside of the cabin. Thus, when the drain hose body 10 is pulled toward the inside of the cabin, the protruding portion 14 positioned in the notch 22 depresses, and expands the width of, the edge portions 22*a*. Such features also reliably expand the hard member 20 in diameter.

As can be seen from the forgoing description, the drain hose 1 according to the embodiments includes the hard member 20 provided with the hooks 21. When a worker secures the drain hose 1 to the body panel P, such a feature allow the worker to easily sense the completion of the securement. Moreover, when the pulling force is applied to the drain hose body 10 in the direction to pull the drain hose body 10 from the through hole P1, the edge portions 22*a* on the notch 22 of the hard member 20 are depressed in a direction to expand the hard member 20 in diameter. Such a feature allows the secured drain hose 1 to be resistant to fall-off from the body panel P. Furthermore, the feature provides a seal to the rim of the through hole P1 without the waterstop packing, which contributes to reduction in the number of the parts.

In addition, the width of the notch 22 of the hard member 20 is narrower toward the inside of the cabin, and the hard member 20 may reliably expand in diameter when pull force is applied to the drain hose body 10 toward the inside of the cabin. Such features allow the hooks 21 to engage with the rim of the through hole P1 even more firmly.

Furthermore, the width of the protruding portion 14 of the drain hose body 10 is wider toward the outside of the cabin, and the hard member 20 may reliably expand in diameter when pull force is applied to the drain hose body 10 toward the inside of the cabin. Such features allow the hooks 21 to engage with the rim of the through hole P1 even more firmly.

Moreover, the downstream portion of the drain hose body 10 is provided with the seal 12, which makes contact with the rim of the through hole P1 on the body panel P, along a whole circumference of the downstream portion. Such a feature achieves an enhanced seal.

The above embodiments are mare examples in all respects, and shall not be construed to be limiting in any way. In addition, numerous variations and modifications which are deemed equivalent to the appended claims all fall within the scope of the present disclosure.

As can be seen from the forgoing description a drain hose according to the present disclosure may be used for vehicle air conditioners, for example.

What is claimed is:

1. A drain hose for draining condensation, collected in a collector, out of a cabin of a vehicle, the collector being included in a vehicle air conditioner installed in the cabin, and the drain hose comprising:
   a drain hose body made of an elastic member, and including an upstream portion and a downstream portion, the upstream portion being coupled to a drain outlet of the collector, and the downstream portion being provided to extend toward an outside of the cabin from a through hole opening on a body panel, and making contact with a rim of the through hole opening; and
   a hard member formed to surround an outer periphery of the downstream portion of the drain hose body, attached to the downstream portion, and made of a material harder than the drain hose body, wherein the hard member includes: a notch defined on a portion of the hard member along a circumference of the hard member; and a hook configured to engage from the outside of the cabin with the rim of the through hole opening on the body panel, the hook protruding from an outer periphery of the hard member,
   the notch of the hard member has a width which is narrower in an axial direction toward the upstream portion of the drain hose body toward an inside of the cabin, and
   the drain hose body includes a depressing portion provided to a part, of the drain hose body, to which the hard member is attached, the depressing portion extending to be positioned in the notch, and, when force is applied to the drain hose body in a direction to pull the drain hose body from the through hole opening, depressing an edge portion of the notch in a direction to expand the hard member in diameter, and
   the depressing portion of the drain hose body has a width which is wider in an axial direction away from the upstream portion of the drain hose body and toward the outside of the cabin so that when the force is applied to the drain hose body, in the direction to pull the drain hose body from the through hole opening, the hard member expands in diameter to displace the hook in a direction to engage with the rim of the through hole opening of the body panel.

2. The drain hose of claim 1, wherein
   the drain hose body includes, on the downstream portion, a seal provided along a whole circumference of the drain hose body, externally extending in a radial direction of the drain hose body, and making contact with the rim of the through hole opening on the body panel.

* * * * *